United States Patent
Koskinen et al.

(10) Patent No.: US 11,985,627 B2
(45) Date of Patent: May 14, 2024

(54) METHOD AND APPARATUS FOR PAGING

(71) Applicant: Nokia Technologies Oy, Espoo (FI)

(72) Inventors: Jussi-Pekka Koskinen, Oulu (FI); Samuli Heikki Turtinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/330,824

(22) Filed: Jun. 7, 2023

(65) Prior Publication Data

US 2023/0403680 A1 Dec. 14, 2023

(30) Foreign Application Priority Data

Jun. 8, 2022 (FI) .................................. 20225501

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC ............................. H04W 68/02; H04W 76/28
USPC ........................................................ 455/458
See application file for complete search history.

(56) References Cited

U.S. PATENT DOCUMENTS

| | | | | |
|---|---|---|---|---|
| 2016/0295504 | A1* | 10/2016 | Wang | H04W 76/28 |
| 2018/0234919 | A1* | 8/2018 | Tsuda | H04W 88/04 |
| 2018/0279256 | A1* | 9/2018 | Wu | H04W 68/02 |
| 2020/0322918 | A1* | 10/2020 | Shih | H04W 56/001 |
| 2021/0127354 | A1* | 4/2021 | Rune | H04W 56/001 |
| 2021/0314979 | A1 | 10/2021 | Agiwal et al. | |
| 2022/0078872 | A1 | 3/2022 | Shrestha et al. | |
| 2023/0077257 | A1* | 3/2023 | Mouquet | H04W 76/28 |

FOREIGN PATENT DOCUMENTS

| | | | | |
|---|---|---|---|---|
| CN | 107534937 B | * | 3/2021 | ........ H04W 52/0216 |
| WO | WO-2018028052 A1 | * | 2/2018 | ............. H04W 4/06 |

OTHER PUBLICATIONS

"Revised WID on support of reduced capability NR devices", 3GPP TSG RAN Meeting #92e, RP-211574, Agenda: 9.7.1.7, Ericsson, Jun. 14-18, 2021, 6 pages.

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

(Continued)

*Primary Examiner* — Inder P Mehra
(74) *Attorney, Agent, or Firm* — Nokia Technologies Oy

(57) ABSTRACT

Embodiments of the present disclosure relate to determination of terminal device's identify. A terminal device determines an identity (ID) of the terminal device based on configuration status of extended Discontinuous Reception (eDRX) and current Radio Resource Control (RRC) state of the terminal device; and determines one or both of paging frame (PF) and paging occasion (PO) based on the determined ID of the terminal device. In this way, paging in the eDRX can work well in RRC idle state or RRC inactive state, and the network and the UE may be synchronized with UE's PF and PO for paging in the eDRX.

24 Claims, 3 Drawing Sheets

(56) References Cited

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
"IEEE 802.11", Wikipedia, Retrieved on Jun. 2, 2023, Webpage available at : https://en.wikipedia.org/wiki/IEEE_802.11.
Office action received for corresponding Finnish Application No. 20225501, dated Oct. 31, 2022, 10 pages.
"3rd Generation Partnership Project; Technical Specification Group Radio Access Network; NR; User Equipment (UE) procedures in Idle mode and RRC Inactive state (Release 17)", 3GPP TS 38.304, V17.0.0, Mar. 2022, pp. 1-50.
"Report of [AT118-e][115][RedCap] 38.304 CR (Samsung) (Phase 2)", 3GPP TSG-RAN WG2 Meeting #118-e, R2-2206688, Agenda: 6.12.2.2.2, Samsung, May 9-20, 2022, 25 pages,.
Office action received for corresponding Finnish Application No. 20225501, dated Mar. 15, 2023, 10 pages.
Extended European Search Report received for corresponding European Patent Application No. 23177138.7, dated Nov. 3, 2023, 16 pages.
"Corrections on RedCap in TS 38.300", 3GPP TSG-RAN2 Meeting #118-e, R2-2206203, Nokia, May 9-20, 2022, 5 pages.
"Support of RRC inactive state", 3GPP TSG RAN WG2 Meeting #106, R2-1906439, Agenda: 12.1.12.2, Intel Corporation, May 13-17, 2019, 4 pages.

\* cited by examiner

METHOD AND APPARATUS FOR PAGING

FIELD

Embodiments of the present disclosure generally relate to the field of communication, and in particular, to a method, devices, apparatus and computer readable storage medium for terminal device identity of paging.

BACKGROUND

With development of communication technology, an extension to a discontinuous reception (DRX), which is called as an extended discontinuous reception (eDRX) mode, has been introduced. The eDRX mode has a longer paging cycle than the DRX mode, which enables the terminal device to save power better, and also leads to a longer downlink data delay. In each eDRX cycle, a terminal device can receive downlink data only within the paging time window (PTW), and the terminal device is in a dormant state during the rest of the time and does not receive downlink data. During the PTW of each eDRX cycle, the terminal device monitors a paging channel for a paging message.

According eDRX enhancements, for example, Reduced Capability (RedCap) user equipment (UE) could support eDRX for Radio Resource Control (RRC) Inactive state and RRC Idle state. In existing eDRX method, paging frame and paging occasion are determined based on the terminal device's identity, for example, UE ID. The determination of the terminal device's identity for paging is required to be enhanced for eDRX for RRC Inactive and RRC Idle.

SUMMARY

In general, example embodiments of the present disclosure provide a method, apparatus and computer readable storage medium for determination of terminal device's identity.

In a first aspect, there is provided a terminal device. The terminal device may comprise one or more transceivers; and one or more processors communicatively coupled to the one or more transceivers, wherein the one or more processors are configured to cause the terminal device to determine an identity (ID) of the terminal device based on configuration status of extended Discontinuous Reception (eDRX) and current Radio Resource Control (RRC) state of the terminal device; and determine one or both of paging frame (PF) and paging occasion (PO) based on the determined ID of the terminal device.

In a second aspect, there is provided a network device. The network device may comprise one or more transceivers; and one or more processors communicatively coupled to the one or more transceivers, and the one or more processors are configured to cause the network device to determine an identity (ID) of a terminal device based on configuration status of extended Discontinuous Reception (eDRX) and current Radio Resource Control (RRC) state of the terminal device; and determine one or both of paging frame (PF) and paging occasion (PO) based on the determined ID of the terminal device.

In a third aspect, there is provided a method implemented at a terminal device. The method may comprise determining an identity (ID) of the terminal device based on configuration status of extended Discontinuous Reception (eDRX) and current Radio Resource Control (RRC) state of the terminal device; and determining one or both of paging frame (PF) and paging occasion (PO) based on the determined ID of the terminal device.

In a fourth aspect, there is provided a method implemented at a network device. The method may comprise determining an identity (ID) of a terminal device based on configuration status of extended Discontinuous Reception (eDRX) and current Radio Resource Control (RRC) state of the terminal device; and determining one or both of paging frame (PF) and paging occasion (PO) based on the determined ID of the terminal device.

In a fifth aspect, there is provided an apparatus of a terminal device. The apparatus may comprise means for determining an identity (ID) of the terminal device based on configuration status of extended Discontinuous Reception (eDRX) and current Radio Resource Control (RRC) state of the terminal device; and means determining one or both of paging frame (PF) and paging occasion (PO) based on the determined ID of the terminal device.

In an sixth aspect, there is provided an apparatus of network device. The apparatus may comprise means for determining an identity (ID) of a terminal device based on configuration status of extended Discontinuous Reception (eDRX) and current Radio Resource Control (RRC) state of the terminal device; and means for determining one or both of paging frame (PF) and paging occasion (PO) based on the determined ID of the terminal device.

In a seventh aspect, there is provided a network device. The terminal device may comprise at least one processor; and at least one memory including computer program codes, wherein the at least one memory and the computer program codes are configured to, with the at least one processor, cause the terminal device to: determine an identity (ID) of the terminal device based on configuration status of extended Discontinuous Reception (eDRX) and current Radio Resource Control (RRC) state of the terminal device; and determine one or both of paging frame (PF) and paging occasion (PO) based on the determined ID of the terminal device.

In an eight aspect, there is provided a network device, comprising: at least one processor; and at least one memory including computer program codes, wherein the at least one memory and the computer program codes are configured to, with the at least one processor, cause the network device to: determine an identity (ID) of a terminal device based on configuration status of extended Discontinuous Reception (eDRX) and current Radio Resource Control (RRC) state of the terminal device; and determine one or both of paging frame (PF) and paging occasion (PO) based on the determined ID of the terminal device.

In a ninth aspect, there is provided a non-transitory computer readable medium comprising program instructions for causing an apparatus to perform at least the method according to third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
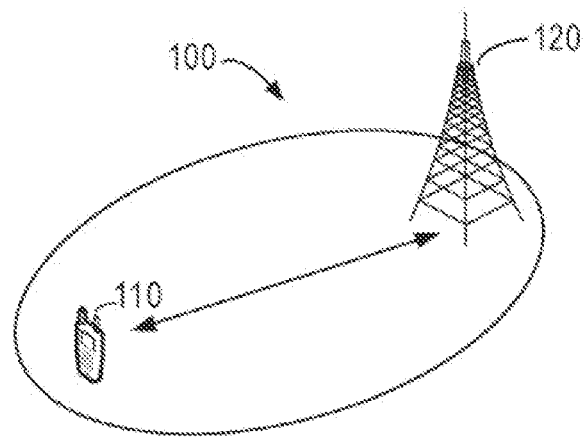
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), which requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehiclemounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, a paging procedure is initiated by a network to notify UE about incoming sessions and/or changes in system information. The UE monitors a paging message addressed to the UE within a periodic search window. The periodic search window is configured by a cell, in which the UE is currently camped. When the UE detects a paging message addressed by the eNB, the UE initiates a system access procedure for connection establishment. The eNB can transmit, at a paging occasion (PO) in the paging frame (PF), to the UE, a physical downlink control channel (PDCCH) message containing scheduling information of Physical Downlink Shared Channel (PDSCH) message, i.e. a paging message.

The eDRX mode has been introduced in Rel-13. The eDRX mode has a longer paging cycle than the DRX mode, which enables the terminal device to save power better, and also leads to a longer downlink data delay. In each eDRX cycle, a terminal device can receive downlink data only within the paging time window (PTW), and the terminal device is in a dormant state during the rest of the time and does not receive downlink data. During the PTW of each eDRX cycle, the terminal device monitors a paging channel for a paging message.

The eDRX may be configured in either RRC inactive state or RRC Idle state and an RRC state specific eDRX-Allowed indication may be broadcasted or provided via dedicated signaling by the network to allow or enable the corresponding eDRX. UE monitors one PO per eDRX cycle. A PO is a set of PDCCH monitoring occasions and can consist of multiple time slots (e.g. subframe or OFDM symbol) where paging downlink control indication (DCI) may be sent. A PF is one Radio Frame and may contain one or multiple PO(s) or starting point of a PO.

In a conventional method, PO and PF is determined based on the terminal device's identity e.g., UE ID, which may be determined by a modulo operation as follows:
If an eDRX cycle is configured by RRC or upper layers and eDRX-Allowed is signaled in system information block 1 (SIB1), the terminal device's identity may be determined by:
5G-S-TMSI mod 4096
Otherwise, the terminal device's identity is determined by:
5G-S-TMSI mod 1024
wherein the 5G-S-TMSI refers to 5G-System Architecture Evolution-Temporary Mobile Subscriber Identity, the 5G-S-TMSI is a temporary identifier of the terminal device provided by 5G core network to uniquely track the UE within the area.
The PF and PO may be determined based on the terminal device's identity:

System Frame Number (SFN) for the PF is determined by:

$$(SFN+PF\_offset) \bmod T = (T \operatorname{div} N)*(UE\_ID \bmod N)$$

wherein T is the DRX cycle of the UE; PF_offset refers to offset used for PF determination and N refers to number of total paging frames in T. The values of N and PF_offset are derived from the parameter nAndPagingFrameOffset as defined in Technical Specification (TS) 38.331.

Index (i_s) indicating the index of the PO is determined by:

$$i\_s = \operatorname{floor}(UE\_ID/N) \bmod Ns$$

wherein Ns is the number of paging occasions for a PF.

However, the determination of the terminal device's identity for paging is required to be enhanced especially for the eDRX for RRC Inactive and RRC Idle.

Hereinafter, the term "the terminal device's identity", "an identity of the terminal device" refers to identity of the terminal device for determining PF and/or PO, which may be called for example UE_ID and determined based on the terminal device's identifier; and the term "the terminal device's identifier" or "an identifier of the terminal device" refers to the identifier assigned by the network or network operation to the terminal device, which may be used to determine identity of the terminal device for determining PF and/or PO.

According to embodiments of the present disclosure, there is provided a solution for determination of terminal device's identity. In this solution, a terminal device determines an ID of the terminal device based on configuration status of eDRX and current RRC state of the terminal device. Moreover, the terminal device determines one or both of PF and PO based on the determined ID of the terminal device. As such, UE_ID usage is clear for PF and PO determination for paging in the eDRX, paging in the eDRX can work well in RRC idle state or RRC inactive state, and the network and the UE may be synchronized with UE's PF and PO for paging in the eDRX. In this way, for both inactive and idle mode, the PF and PO may be distributed more dispersed based on different UE_ID values than those without eDRX, and more UEs with eDRX configuration may be paged when the paging load is high.

Example embodiments of the present disclosure for determination of terminal device's identity will be described below with reference to FIGS. 1-5.

FIG. 1 illustrates an example network environment 100 in which example embodiments of the present disclosure may be implemented. The environment 100, which may be a part of a communication network, comprises terminal devices and network devices.

As illustrated in FIG. 1, the communication network 100 may comprise a terminal device 110 (hereinafter may also be referred to as a UE 110 or a first device 110). The communication network 100 may further comprise a network device 120. The network device 120 can manage a cell. The terminal device 110 and the network device 120 can communicate with each other in the coverage of the cell. In some example embodiments, the overall coverage of the cells may be referred to as paging area.

The network device 120 may configure the terminal device 110 with the eDRX configuration parameters. The eDRX configuration parameters may include, but not limited to, the eDRX cycle, the On-duration timer, the inactivity timer, the DRX start offset, the DRX retransmission timer and so on. With the eDRX configuration parameters, the terminal device 110 may know when to sleep and when to monitor the paging channel.

The terminal device 110 may be configured with the idle eDRX mode or the inactive eDRX mode. If the terminal device 110 is configured with the idle eDRX mode and an eDRX-Allowed for idle is broadcasted, the UE is allowed to use idle eDRX mode. If the UE is configured with the inactive eDRX mode and an eDRX-Allowed for inactive is broadcasted, the UE is allowed to use inactive eDRX mode.

It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the environment 100.

Communications in the network environment 100 may be implemented according to any proper communication protocol(s), comprising, but not limited to, the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Multiple-Input Multiple-Output (MIMO), Orthogonal Frequency Division Multiplexing (OFDM), time division multiplexing (TDM), frequency division multiplexing (FDM), code division multiplexing (CDM), Bluetooth, Zig-Bee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

Figure 2:
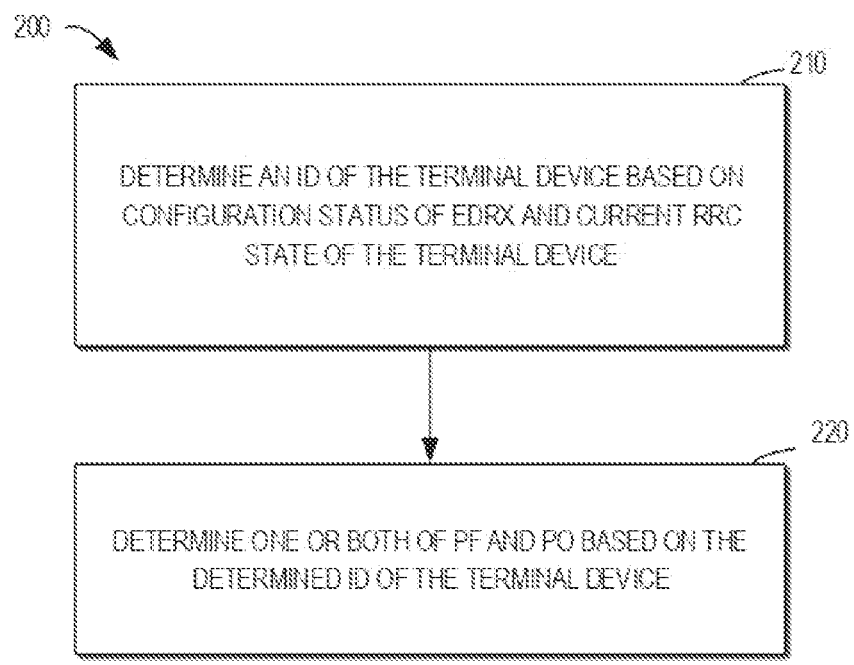
FIG. 2 illustrates a flowchart of a method implemented at a terminal device according to some embodiments of the present disclosure.

FIG. 2 illustrates a flowchart of a method 200 implemented at a terminal device according to some embodiments of the present disclosure. For the purpose of discussion, the method 200 will be described from the perspective of the terminal device 110 with reference to FIG. 1. It is to be understood that method 200 may further include additional blocks not shown and/or omit some shown blocks, and the scope of the present disclosure is not limited in this regard.

At block 210, the terminal device 110 may determine an ID of the terminal device based on configuration status of eDRX and current RRC state of the terminal device. In other words, the ID of the terminal devices 110 may be different when configuration status of eDRX and when the UE is in different RRC states.

In some embodiments, configuration status of eDRX may indicate whether eDRX allowed indication information is signaled and which RRC state is associated with the eDRX allowed indication information. For example, the eDRX-Allowed-Idle or eDRX-Allowed-Inactive may be broadcasted by the network device 120. It is to be understood that eDRX-Allowed-Idle and eDRX-Allowed-Inactive may be merely examples of the names of the eDRX allowed indications and may equally apply to any eDRX allowed indication for idle mode or inactive mode, respectively.

In some embodiments, the configuration status of eDRX may indicate whether to enable or allow use of the eDRX or not. For example, the terminal device 110 is configured with idle eDRX mode and eDRX-Allowed-Idle is broadcasted, the terminal device 110 is allowed to use idle eDRX mode. In another example, the terminal device 110 is configured with inactive eDRX mode and eDRX-Allowed-Inactive is broadcasted, the terminal device 110 is allowed to use inactive eDRX mode. It should be noted that broadcasting eDRX allowed indication is merely an example, and the eDRX allowed indication may equally be provided via other means, e.g., dedicated signalling through RRC. For example, the eDRX allowed indication may be broadcasted in a cell and provide eDRX allowed indication information for that cell. For example, the eDRX allowed indication may be broadcasted in System Information Block Type 1 (SIB1).

In some embodiments, the determining the ID of the terminal device 110 may comprise determining the ID of the terminal device 110 based on an identifier of the terminal device 110 and an integer, wherein the integer is dependent on the configuration status of eDRX. For example, the ID of the terminal device 110 may be determined by modulo operation on an identifier of the terminal device with the integer.

In some embodiments, the determining the ID of the terminal device 110 may comprise any of: determining the ID of the terminal device 110 using a first integer when the current RRC state of the terminal device 110 is consistent to an RRC state associated with configured eDRX allowed indication information; or determining the ID of the terminal device 110 using a second integer in other cases, wherein the second integer is different from the first integer.

In an example, the identity of the terminal device 110 may be determined by 5G-S-TMSI mod 4096 in case that the UE is in IDLE and eDRX-Allowed-IDLE is broadcasted on the cell.

In an example, the identity of the terminal device 110 may be determined by 5G-S-TMSI mod 4096 in case the UE that is in INACTIVE and eDRX-Allowed-INACTIVE is broadcasted on the cell.

In an example, the identity of the terminal device 110 may be determined by 5G-S-TMSI mod 1024 in case that the UE is in IDLE and eDRX-Allowed-IDLE is not broadcasted on the cell.

In an example, the identity of the terminal device 110 may be by 5G-S-TMSI mod 1024 in case that the UE is in INACTIVE and eDRX-Allowed-INACTIVE is not broadcasted on the cell.

In an example, the identity of the terminal device 110 may be determined by 5G-S-TMSI mod 4096 in case that the UE is in IDLE and eDRX is allowed in IDLE.

In an example, the identity of the terminal device 110 may be determined by 5G-S-TMSI mod 4096 in case the UE that is in INACTIVE and eDRX is allowed in INACTIVE.

In an example, the identity of the terminal device 110 may be determined by 5G-S-TMSI mod 1024 in case that the UE is in IDLE and eDRX is not allowed in IDLE.

In an example, the identity of the terminal device 110 may be by 5G-S-TMSI mod 1024 in case that the UE is in INACTIVE and eDRX is not allowed in INACTIVE.

In an example, the eDRX is allowed or not allowed in IDLE or INACTIVE for each cell separately.

In one example, the identity of the terminal device 110 may be determined by 5G-S-TMSI mod 1024 if the UE has eDRX configuration for idle mode (while not configured for inactive mode) and the UE is in inactive mode while eDRX-Allowed-IDLE (and/or eDRX-Allowed-INACTIVE) is broadcasted in the cell. In other words, the eDRX configuration for the UE_ID determination is only accounted if the eDRX configuration is provided for the current UE state (Idle and/or Inactive).

In one example, the identity of the terminal device 110 may be determined by 5G-S-TMSI mod 1024 if the UE has eDRX configuration for inactive mode (while not configured for idle mode) and is in the idle mode while eDRX-Allowed-INACTIVE (and/or eDRX-Allowed-IDLE) is broadcasted in the cell.

For illustrative purposes, an example of possible implementations in TS 38.304 may be given as follows:

Example 1

---

If an eDRX cycle is configured by upper layers and eDRX-Allowed-IDLE is signalled in SIBI and the UE is in RRC_idle mode; or
If an eDRX cycle is configured by RRC and eDRX-Allowed-INACTIVE is signalled in SIBI and the UE is in RRC_INACTIVE mode:
  - 5G-S-TMSI mod 4096
else:
  - 5G-S-TMSI mod 1024

---

In some embodiments, the determining the ID of the terminal device 110 may comprise any of: determining the ID of the terminal device 110 using a first integer when the terminal device 110 is in an RRC idle state and the eDRX allowed indication information indicates allowing eDRX in an RRC idle state; determining the ID of the terminal device 110 using a third integer when the terminal device 110 is in an RRC inactive state and the eDRX allowed indication information indicates allowing eDRX in an RRC inactive state; or determining the ID of the terminal device 110 using a second integer in other cases. The second integer may be different from the first integer and the third integer.

For example, when the terminal device 110 is in RRC idle state and an eDRX-Allowed-IDLE is broadcasted on the cell, the ID of the terminal device 110 may be determined by 5G-S-TMSI mod for example, 16384. When the terminal device 110 is in RRC inactive state and the eDRX-Allowed-INACTIVE is broadcasted on the cell, the ID of the terminal device 110 may be determined by 5G-S-TMSI mod, for example, 4096. Otherwise, the ID of the terminal device 110 may be determined by 5G-S-TMSI mod, for example, 1024.

For illustrative purposes, an example of possible implementations in TS 38.304 may be given as follows:

Example 2

---

If an eDRX cycle is configured by upper layers and eDRX-Allowed-IDLE is signalled in SIBI and the UE is in RRC_idle mode:
  - 5G-S-TMSI mod 16384.
else if an eDRX cycle is configured by RRC and eDRX-Allowed-INACTIVE is signalled in SIBI and the UE is in RRC_INACTIVE mode:
  - 5G-S-TMSI mod 4096
else:
  - 5G-S-TMSI mod 1024

---

In some embodiments, the determining the ID of the terminal device 110 may comprise determining the ID of the terminal device 110 further based on whether the eDRX is configured for the current RRC state of the terminal device 110, wherein the eDRX is configured in RRC idle state, or the eDRX is configured in RRC inactive state.

In some embodiments, the third integer may be different from the first integer, Or alternatively, the third integer may be same as the first integer. For example, the first integer may be 16384 and the third integer may be 4096. In another example, both the first integer and the third integer may be 4096.

In some embodiments, the determining the ID of the terminal device 110 further comprises determining the ID of the terminal device using a fourth integer when the terminal device is in an RRC inactive state and the terminal device is configured with an eDRX in an RRC idle state and the allowed indication information indicates allowing eDRX in an RRC idle state. The fourth integer may be same as the first or third integer. Or alternatively, the fourth integer may be different from the first or third integer.

For example, when the terminal device 110 is configured with inactive eDRX mode, and the terminal device 110 is in RRC idle state while eDRX-Allowed-IDLE is broadcasted on the cell, the ID of the terminal device 110 is also determined by 5G-S-TMSI mod 1024.

In some embodiments, the second integer is smaller than another integer. For example, the second integer may be 1024, the another integer may be 4096.

In some embodiments, the identifier of the terminal device 110 for determining the identity of the terminal device may be any of a Fifth Generation System Temporary Mobile Station Identifier (5G-S-TMSI); an International Mobile Subscriber Identification Number (IMSI); or a short version of Inactive Radio Network Temporary Identifier (I-RNTI); or a full version of Inactive Radio Network Temporary Identifier.

In some embodiments, the determining the ID of the terminal device 110 may comprise determining the ID of the terminal device 110 further based on a configured eDRX cycle. For example, an eDRX cycle may be configured by RRC or upper layers, and the eDRX cycle could be accounted only in certain RRC state, e.g., in idle or in inactive state or in both states.

In some embodiments, an integer for determining the ID of the terminal device 110 is determined based on a configured eDRX cycle. For example, if the eDRX length is under or up to 5.12 s or 10.24 s, the ID of the terminal device 110 is determined by 5G-S-TMSI mod 1024; and for any longer values of eDRX cycle, the ID of the terminal device 110 is determined by 5G-S-TMSI mod 4096. The eDRX cycle length threshold to use different modulo operation could be predefined in the standard or configured by the network.

It is to be noted that usage of the configured eDRX cycle in determining the above-mentioned integer is described in combination with the above factors (the configuration status of the eDRX and current state of the terminal device) for determination of identity of the terminal device; however, it may be used separately without combining with the above factors. In other words, the configured eDRX cycle can also be used as a solely factor to be further considered in determining the UE_ID, or a factor combined with other factors than the above ones.

In some embodiments, the eDRX is signaled by broadcast signaling or dedicated signaling; and/or wherein the broadcast signaling comprises system information block 1 (SIB1) carrying eDRX allowed indication information. For example, eDRX-Allowed-IDLE or eDRX-Allowed-INACTIVE may be signaled in SIB1.

In some embodiments, the integer comprises any of: 1024, 2048, 4096, 16384, or 65536.

In some embodiments, the RRC state may comprises an RRC idle state and an RRC inactive state; and/or wherein the eDRX allowed indication information is specific to the RRC state. For example, eDRX-Allowed-IDLE is specific to RRC idle state, and eDRX-Allowed-INACTIVE is specific to RRC inactive state.

In some embodiments, the ID of the terminal device is determined by a modulo operation.

At block 220, the terminal device 110 may determine one or both of paging frame (PF) and paging occasion (PO) based on the determined ID of the terminal device. In other words, the PF and/or PO may be distributed based on different ID values of the terminal device.

For example, SFN for the PF may be determined by:

(SFN+PF_offset)mod *T*=(*T* div *N*)*(UE_ID mod *N*)

wherein T is the eDRX cycle of the UE; PF_offset refers to offset used for PF determination and N refers to number of total paging frames in T; the values of N and PF_offset are derived from the parameter nAndPagingFrameOffset as defined in TS 38.331 [3].

In one example, T for determining the PF may be determined as follows:

embodiments of the present disclosure. For the purpose of discussion, the method 300 will be described from the perspective of the network device 120 with reference to FIG. 1. It is to be understood that method 300 may further include additional blocks not shown and/or omit some shown blocks, and the scope of the present disclosure is not limited in this regard.

At block 310, the network device 120 may determine an ID of a terminal device 110 based on configuration status of eDRX and RRC state of the terminal device 110.

In some embodiments, the determining the ID of the terminal device 110 comprises determining the ID of the terminal device 110 based on an identifier of the terminal device 110 and an integer, wherein the integer is dependent on the configuration status of eDRX.

In some embodiments, the determining the ID of the terminal device 110 comprises any of: determining the ID of the terminal device 110 using a first integer when the current RRC state of the terminal device 110 is consistent to an RRC state associated with configured eDRX allowed indication information; or determining the ID of the terminal device 110 using a second integer in other cases, wherein the second integer is different from the first integer.

In some embodiments, the determining the ID of the terminal device 110 comprises any of: determining the ID of the terminal device 110 using a first integer when the terminal device 110 is in an RRC idle state and eDRX allowed indication information indicates the eDRX in an RRC idle state; determining the ID of the terminal device 110 using a third integer when the terminal device is in an RRC inactive state and eDRX allowed indication information indicates the eDRX in an RRC inactive state, wherein the third integer is different from the first integer or same as

---

If the UE is in RRC_IDLE and eDRX-Allowed-IDLE is not signalled in SIB1 or if the UE
is in RRC_INACTIVE and eDRX-Allowed-INACTIVE is not signalled in SIB1 or eDRX
is not configured:
 - T is determined by the shortest of the UE specific DRX value(s), if configured
by RRC and/or upper layers, and a default DRX value broadcast in system information.
In RRC_IDLE state, if UE specific DRX is not configured by upper layers, the default
value is applied.
In RRC_IDLE state, if eDRX-Allowed-IDLE or in RRC_INACTIVE state, if eDRX-
Allowed-Inactive is signalled in SIB1 and eDRX is configured by upper layers, i.e.,
$T_{eDRX}$,
$CN$:
 - If $T_{eDRX, CN}$ is no longer than 1024 radio frames:
 - T = $T_{eDRX, CN}$;
else:
 - During CN configured PTW, T is determined by the shortest of UE
 specific DRX value, if configured by upper layers, and the default DRX value
 broadcast in system information.
In RRC_INACTIVE state, if eDRX-Allowed-Inactive is signalled in SIB1 and eDRX is
configured by RRC, i.e., $T_{eDRX, RAN}$, and/or upper layers, i.e., $T_{eDRX, CN}$:
 - If both $T_{eDRX, CN}$ and $T_{eDRX, RAN}$ are no longer than 1024 radio frames:
 - T = min{$T_{eDRX, RAN}$, $T_{eDRX, CN}$}.
 - If $T_{eDRX, CN}$ is no longer than 1024 radio frames and no $T_{eDRX, RAN}$ is
configured:
 - T = min{DRX value configured by RRC, $T_{eDRX, CN}$}.

---

Index (i_s) indicating the index of the PO may be determined by:

i_s=floor(UE_ID/*N*)mod Ns wherein Ns is the number of paging occasions for a PF.

In some embodiments, the method 200 further comprises monitoring a paging message at one or both of the determined PF and the determined PO.

Figure 3:
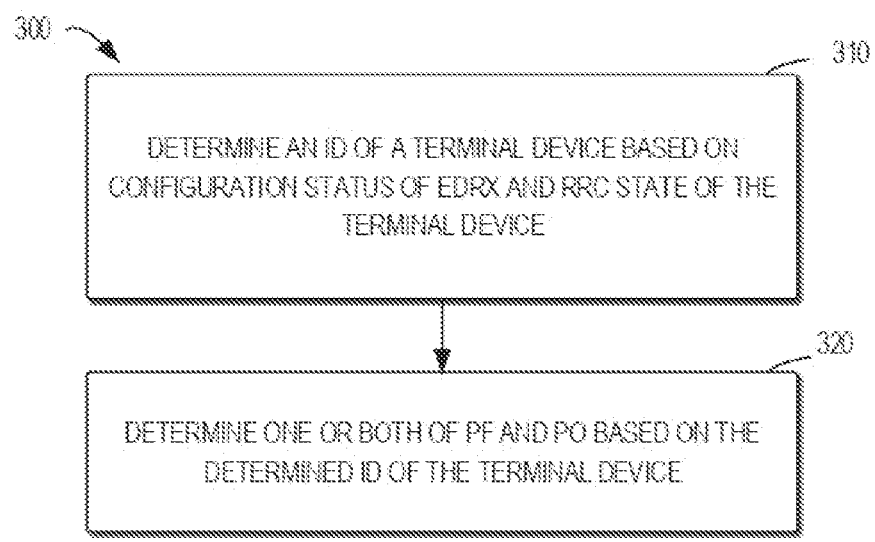
FIG. 3 illustrates a flowchart of a method implemented at a network device according to some other embodiments of the present disclosure.

FIG. 3 illustrates a flowchart of a method 300 implemented at a network device in accordance with some the first integer; or determining the ID of the terminal device 110 using a second integer in other cases, wherein the second integer is different from the first integer and the third integer.

In some embodiments, the determining the ID of the terminal device 110 comprises determining the ID of the terminal device 110 further based on a configured eDRX cycle.

In some embodiments, the RRC state comprises RRC idle state and RRC inactive state, the eDRX is configured by eDRX allowed indication information, and the eDRX allowed indication information is specific to the RRC state.

At block 320, the network device 120 may determine one or both of paging frame (PF) and paging occasion (PO) based on the determined ID of the terminal device 110.

In some embodiments, the method 300 may further comprise transmitting a paging message at one or both of the determined PF and the determined PO.

It is to be noted that the network device may know or at least infer configuration status of the eDRX, RRC status of the terminal device, or other factors, and thus will perform similar operations as the terminal device. Therefore, UE_ID usage for PF and PO determination for paging in the eDRX is clear for both terminal device and network, paging in the eDRX can work well in RRC idle state or RRC inactive state, and the network and the UE may be synchronized with UE's PF and PO for paging in the eDRX. In this way, for both inactive and idle mode, the PF and PO may be distributed more dispersed based on different UE_ID values than those without eDRX, and more UEs with eDRX configuration may be paged when the paging load is high.

Figure 4:
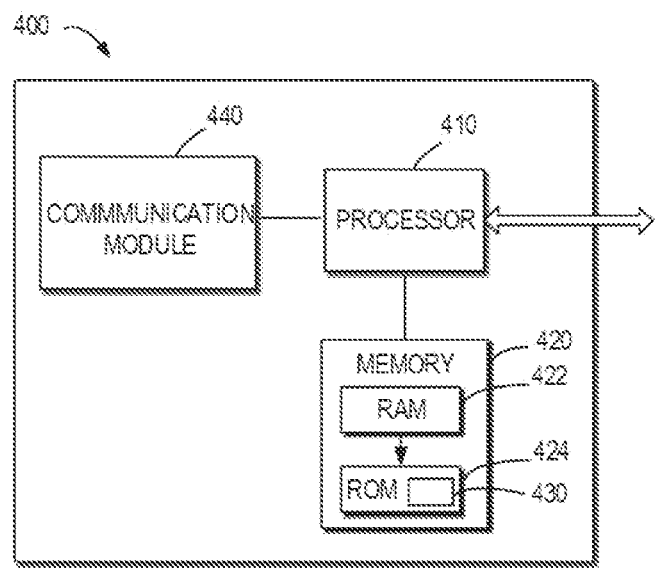
FIG. 4 illustrates a simplified block diagram of an apparatus that is suitable for implementing embodiments of the present disclosure.

FIG. 4 is a simplified block diagram of a device 400 that is suitable for implementing embodiments of the present disclosure. The device 400 may be provided to implement the communication device, for example the terminal device 110, the network device 120 as shown in FIG. 1. As shown, the device 400 includes one or more processors 410, one or more memories 420 coupled to the processor 410, and one or more transmitters and/or receivers (TX/RX) 440 coupled to the processor 410.

The TX/RX 440 is for bidirectional communications. The TX/RX 440 has at least one antenna to facilitate communication. The communication interface may represent any interface that is necessary for communication with other network elements.

The processor 410 may be of any type suitable to the local technical network and may include one or more of the following: general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may include one or more non-volatile memories and one or more volatile memories. Examples of the non-volatile memories include, but are not limited to, a Read Only Memory (ROM) 424, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 422 and other volatile memories that will not last in the power-down duration.

A computer program 430 includes computer executable instructions that are executed by the associated processor 410. The program 430 may be stored in the ROM 424. The processor 410 may perform any suitable actions and processing by loading the program 430 into the RAM 422.

The embodiments of the present disclosure may be implemented by means of the program 430 so that the device 400 may perform any process of the disclosure as discussed with reference to FIGS. 2 to 3. The embodiments of the present disclosure may also be implemented by hardware or by a combination of software and hardware.

Figure 5:
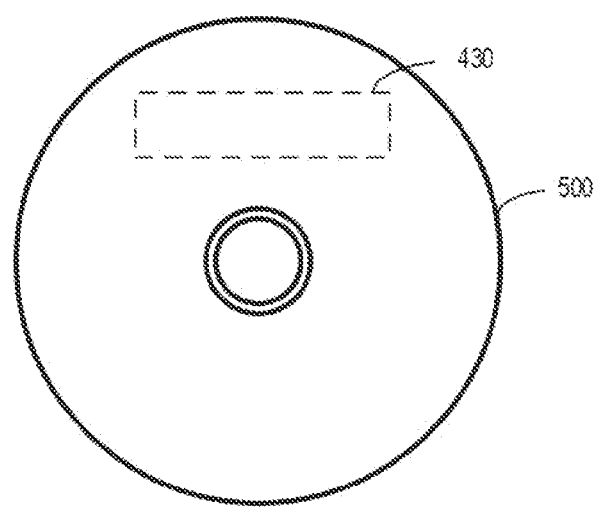
FIG. 5 illustrates a block diagram of an example computer readable medium in accordance with some embodiments of the present disclosure.

In some embodiments, the program 430 may be tangibly contained in a computer readable medium which may be included in the device 400 (such as in the memory 420) or other storage devices that are accessible by the device 400. The device 400 may load the program 430 from the computer readable medium to the RAM 422 for execution. The computer readable medium may include any types of tangible non-volatile storage, such as ROM, EPROM, a flash memory, a hard disk, CD, DVD, and the like. FIG. 5 shows an example of the computer readable medium 500 in form of CD or DVD. The computer readable medium has the program 430 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 or 300 as described above with reference to FIGS. 2-3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. A terminal device, comprising:
one or more transceivers; and
   one or more processors communicatively coupled to the one or more transceivers, wherein the one or more processors are configured to cause the terminal device to:
   determine an identity (ID) of the terminal device based on configuration status of extended Discontinuous Reception (eDRX) and current Radio Resource Control (RRC) state of the terminal device; and
   determine one or both of paging frame (PF) and paging occasion (PO) based on the determined ID of the terminal device;
   wherein determining the ID of the terminal device comprises determining the ID of the terminal device based on an identifier of the terminal device and an integer, wherein the integer is dependent on the configuration status of eDRX; and
   wherein the determining the ID of the terminal device comprises any of:
      determining the ID of the terminal device using a first integer when the current RRC state of the terminal device is consistent to an RRC state associated with configured eDRX allowed indication information; or
      determining the ID of the terminal device using a second integer in other cases, wherein the second integer is different from the first integer.

2. The terminal device according to claim 1, wherein the configuration status of eDRX indicates whether eDRX allowed indication information is signaled and which RRC state is associated with the eDRX allowed indication information.

3. The terminal device according to claim 1, wherein the configuration status of eDRX indicates whether to enable or allow use of the eDRX or not.

4. The terminal device according to claim 1, wherein the determining the ID of the terminal device comprises determining the ID of the terminal device further based on whether the eDRX is configured for the current RRC state of the terminal device,
   wherein the eDRX is configured in RRC idle state, or the eDRX is configured in RRC inactive state.

5. The terminal device according to claim 1, wherein the second integer is smaller than another integer.

6. The terminal device according to claim 1, wherein the identifier of the terminal device is any of
   a Fifth Generation System Temporary Mobile Station Identifier (5G-S-TMSI);
   an International Mobile Subscriber Identification Number (IMSI); or
   a short version of Inactive Radio Network Temporary Identifier (I-RNTI); or
   a full version of Inactive Radio Network Temporary Identifier.

7. The terminal device according to claim 1, wherein determining the ID of the terminal device comprises determining the ID of the terminal device further based on a configured eDRX cycle.

8. The terminal device according to claim 7, wherein an integer for determining the ID of the terminal device is determined based on a configured eDRX cycle.

9. The terminal device according to claim 1, wherein the eDRX is signaled by broadcast signaling or dedicated signaling; and/or,
   wherein the broadcast signaling comprises system information block 1 (SIB1) carrying eDRX allowed indication information.

10. The terminal device according to claim 1, the integer comprises any of: 1024, 2048, 4096, 16384, or 65536.

11. The terminal device according to claim 1, wherein the RRC state comprises an RRC idle state and an RRC inactive state; and/or
   wherein the eDRX allowed indication information is specific to the RRC state.

12. The terminal device according to claim 1, wherein the ID of the terminal device is determined by a modulo operation.

13. The terminal device according to claim 1, wherein the terminal device is further caused to: monitor a paging message at one or both of the determined PF and the determined PO.

14. The terminal device of claim 1, wherein the configured eDRX allowed indication information comprises an eDRX Allowed IDLE or an eDRX Allowed INACTIVE information.

15. A network device, comprising:
one or more transceivers; and
   one or more processors communicatively coupled to the one or more transceivers, and the one or more processors are configured to cause the network device to:
   determine an identity (ID) of a terminal device based on configuration status of extended Discontinuous Reception (eDRX) and current Radio Resource Control (RRC) state of the terminal device; and
   determine one or both of paging frame (PF) and paging occasion (PO) based on the determined ID of the terminal device;

wherein determining the ID of the terminal device comprises determining the ID of the terminal device based on an identifier of the terminal device and an integer, wherein the integer is dependent on the configuration status of eDRX; and wherein the determining the ID of the terminal device comprises any of:
  determining the ID of the terminal device using a first integer when the current RRC state of the terminal device is consistent to an RRC state associated with configured eDRX allowed indication information; or
  determining the ID of the terminal device using a second integer in other cases, wherein the second integer is different from the first integer.

16. The network device according to claim 15, wherein the determining the ID of the terminal device comprises any of:
  determining the ID of the terminal device using a first integer when the terminal device is in an RRC idle state and eDRX allowed indication information indicates the eDRX in an RRC idle state;
  determining the ID of the terminal device using a third integer when the terminal device is in an RRC inactive state and eDRX allowed indication information indicates the eDRX in an RRC inactive state, wherein the third integer is different from the first integer or same as the first integer; or
  determining the ID of the terminal device using a second integer in other cases, wherein, wherein the second integer is different from the first integer and the third integer.

17. The network device according to claim 15, wherein determining the ID of the terminal device comprises determining the ID of the terminal device further based on a configured eDRX cycle.

18. The network device according to claim 15, wherein the RRC state comprises RRC idle state and RRC inactive state, the eDRX is configured by eDRX allowed indication information, and the eDRX allowed indication information is specific to the RRC state.

19. The network device according to claim 15, wherein the network device is further caused to transmit a paging message at one or both of the determined PF and the determined PO.

20. The network device of claim 15, wherein the configured eDRX allowed indication information comprises one of an eDRX Allowed IDLE or an eDRX Allowed INACTIVE information.

21. A method at a terminal device comprising:
  determining an identity (ID) of the terminal device based on configuration status of extended Discontinuous Reception (eDRX) and current Radio Resource Control (RRC) state of the terminal device; and
  determining one or both of paging frame (PF) and paging occasion (PO) based on the determined ID of the terminal device;
  wherein determining the ID of the terminal device comprises determining the ID of the terminal device based on an identifier of the terminal device and an integer, wherein the integer is dependent on the configuration status of eDRX; and
  wherein the determining the ID of the terminal device comprises any of:
    determining the ID of the terminal device using a first integer when the current RRC state of the terminal device is consistent to an RRC state associated with configured eDRX allowed indication information; or
    determining the ID of the terminal device using a second integer in other cases, wherein the second integer is different from the first integer.

22. The method of claim 21, wherein the configured eDRX allowed indication information comprises one of an eDRX Allowed IDLE or an eDRX Allowed INACTIVE information.

23. A method at a network device comprising:
  determining an identity (ID) of a terminal device based on configuration status of extended Discontinuous Reception (eDRX) and current Radio Resource Control (RRC) state of the terminal device; and
  determining one or both of paging frame (PF) and paging occasion (PO) based on the determined ID of the terminal device;
  wherein determining the ID of the terminal device comprises determining the ID of the terminal device based on an identifier of the terminal device and an integer, wherein the integer is dependent on the configuration status of eDRX; and
  wherein the determining the ID of the terminal device comprises any of:
    determining the ID of the terminal device using a first integer when the current RRC state of the terminal device is consistent to an RRC state associated with configured eDRX allowed indication information; or
    determining the ID of the terminal device using a second integer in other cases, wherein the second integer is different from the first integer.

24. The method of claim 23, wherein the configured eDRX allowed indication information comprises an eDRX Allowed IDLE or an eDRX Allowed INACTIVE information.

* * * * *